(12) United States Patent
Van Der Tempel et al.

(10) Patent No.: US 12,196,186 B2
(45) Date of Patent: Jan. 14, 2025

(54) TURBINE AND MULTI PISTON PUMP

(71) Applicant: Delft Offshore Turbine B.V., Delft (NL)

(72) Inventors: Jan Van Der Tempel, Warten (NL); Wouter Vullers, Markegem (NL); Marcel Steinbreder, Delft (NL); Gijs Druijf, 's-Gravenhage (NL)

(73) Assignee: DELFT OFFSHORE TURBINE B.V., Delft (NL)

( * ) Notice: Subject to any disclaimer, the term of this patent is extended or adjusted under 35 U.S.C. 154(b) by 22 days.

(21) Appl. No.: 17/786,144

(22) PCT Filed: Dec. 17, 2020

(86) PCT No.: PCT/NL2020/050798
§ 371 (c)(1),
(2) Date: Jun. 16, 2022

(87) PCT Pub. No.: WO2021/125954
PCT Pub. Date: Jun. 24, 2021

(65) Prior Publication Data
US 2023/0010443 A1    Jan. 12, 2023

(30) Foreign Application Priority Data
Dec. 17, 2019   (NL) ...................................... 2024476

(51) Int. Cl.
*F03D 9/28*     (2016.01)
*F04B 1/043*    (2020.01)
(Continued)

(52) U.S. Cl.
CPC ................ *F03D 9/28* (2016.05); *F04B 1/043* (2013.01); *F04B 1/047* (2013.01); *F04B 17/02* (2013.01)

(58) Field of Classification Search
CPC ........ F04B 1/047; F04B 1/0408; F04B 17/02; F03D 9/28
See application file for complete search history.

(56) References Cited

U.S. PATENT DOCUMENTS 2,461,121 A * 2/1949 Markham ........... F04B 27/0428
                                                          417/538
4,009,643 A * 3/1977 Thumm ................ E02F 3/4135
                                                          414/739
(Continued)

FOREIGN PATENT DOCUMENTS

EP    2821648 A1    1/2015
GB    2482879 A *   2/2012    ............ F01B 1/0624
(Continued)

OTHER PUBLICATIONS

International Search Report dated Mar. 31, 2021, issued in corresponding International Patent Application No. PCT/NL2020/050798 (3 pgs.).

(Continued)

*Primary Examiner* — Thomas E Lazo
(74) *Attorney, Agent, or Firm* — Pillsbury Winthrop Shaw Pittman, LLP

(57) ABSTRACT

A turbine, wherein a propeller is mounted to said turbine, rotatable around a propeller axis, wherein a multi piston pump is provided, said multi piston pump being drivable by said propeller for pressurizing a pumping fluid, wherein the multi piston pump comprises a central part and a drive ring extending around the central part, wherein the central part comprises a series of piston-cylinder assemblies which are each compressible and extendible in a respective radial direction with respect to a common central axis, wherein each of the piston-cylinder assemblies is directly or indirectly engageable by the drive ring for radial compression thereof, in particular for pressurizing said pumping fluid, (Continued)

wherein at least one of the piston-cylinder assemblies is provided with a hydraulic and/or pneumatic biasing means for biasing, at least selectively biasing, at least part of that piston-cylinder assembly towards engagement with the drive ring, in particular substantially independent of and/or complementary to a biasing by a pressure of pumping fluid at that piston-cylinder assembly.

27 Claims, 5 Drawing Sheets

(51) Int. Cl.
*F04B 1/047* (2020.01)
*F04B 17/02* (2006.01)

(56) References Cited

U.S. PATENT DOCUMENTS

| | | | | |
|---|---|---|---|---|
| 5,249,512 A | * | 10/1993 | Christenson | F04B 1/0408 |
| | | | | 417/273 |
| 5,651,301 A | * | 7/1997 | Thoma | F04B 1/1071 |
| | | | | 417/273 |
| 5,878,648 A | * | 3/1999 | Dworak | F04B 49/128 |
| | | | | 92/72 |
| 7,603,941 B2 | * | 10/2009 | Lemaire | F03C 1/247 |
| | | | | 417/273 |
| 8,959,906 B2 | * | 2/2015 | Haines | F04B 39/1073 |
| | | | | 91/485 |
| 9,328,720 B2 | * | 5/2016 | Caldwell | F04B 49/065 |
| 2006/0002802 A1 | * | 1/2006 | Lemaire | G10L 15/22 |
| | | | | 704/E15.04 |
| 2012/0087820 A1 | * | 4/2012 | Patterson | F04C 2/3446 |
| | | | | 418/106 |
| 2016/0208898 A1 | * | 7/2016 | Caldwell | F16H 61/4183 |
| 2018/0187661 A1 | * | 7/2018 | Bozic | F03C 1/0472 |
| 2019/0153865 A1 | * | 5/2019 | Hare | F04B 1/0413 |

FOREIGN PATENT DOCUMENTS

| | | |
|---|---|---|
| WO | 2018/108894 A1 | 6/2018 |
| WO | WO-2018226100 A1 * 12/2018 | ............. F03D 15/00 |

OTHER PUBLICATIONS

Written Opinion of the International Searching Authority dated Mar. 31, 2021, issued in corresponding International Patent Application No. PCT/NL2020/050798 (5 pgs.).

* cited by examiner

TURBINE AND MULTI PISTON PUMP

CROSS-REFERENCE TO RELATED APPLICATIONS

This application is a national stage entry of PCT/NL2020/050798, filed Dec. 17, 2020, which claims priority to Netherlands Application No. 2024476, filed Dec. 17, 2019, the contents of each of which are herein incorporated by reference in their entireties.

The invention relates to a turbine and to a multi piston pump, in particular to a turbine provided with a multi piston pump.

It is known as such to provide a turbine, for example a wind turbine, with a multi piston pump. In one application, such a pump can directly or indirectly drive a generator which can be remote from the turbine. The pump can for example pump sea water as a pumping fluid, for example in the case of an offshore wind turbine.

As one example, WO2018/226100 describes a wind turbine with a hydraulic pump, wherein the hydraulic pump can be a multi piston pump. The teachings of WO2018/226100 are incorporated herein by reference in their entirety.

WO2018/108894 describes a piston pump and use thereof in a wind turbine, wherein mechanical springs can be provided to automatically push pistons from their cylinders.

An aim of the present disclosure is to provide an alternative, in particular an improved, design for a multi piston pump for a turbine. An aim is to provide a turbine with a multi piston pump which is more efficient and/or more compact. An aim is to reduce a required feed pressure of such a multi piston pump. An aim is to improve, in particular increase, the engagement between a drive ring and a piston-cylinder assembly in such a multi piston pump during operation. An aim is to reduce undesired disengagement of the piston-cylinder assembly from the drive ring. An aim is to provide a reliable and/or durable turbine and pump, which in particular can be serviced efficiently, for example requiring few or no repairs or replacements. An aim is to reduce fretting in such a multi piston pump and turbine. An aim is to provide a multi piston pump which can operate more efficiently under partial load conditions. An aim is to provide a wind turbine which can operate more efficiently at lower wind speeds.

At least one or some of these and other aims can at least partly be obtained with a turbine, multi piston pump and/or method according to the disclosure.

Aspects according to the disclosure provide a turbine, wherein a propeller is mounted to said turbine, rotatable around a propeller axis, wherein a multi piston pump is provided, said multi piston pump being drivable by said propeller for pressurizing a pumping fluid.

The multi piston pump comprises a central part and a drive ring.

The central part comprises a series of piston-cylinder assemblies which are each compressible and extendible in a respective radial direction with respect to a common central axis. Each of the piston-cylinder assemblies is directly or indirectly engageable by the drive ring for radial compression thereof, in particular for pressurizing said pumping fluid.

In the present disclosure each piston-cylinder assembly at least comprises, as is known in the art, a piston and a cylinder, the piston movable in the cylinder, and a chamber defined by at least said piston and cylinder. The volume of said chamber can be varied by moving said piston relative to said cylinder, reducing or expanding said chamber volume.

In the present disclosure in the context of piston-cylinder assemblies, terms such as 'compress' and 'compressible' refer to a piston moving (further) into a respective cylinder while terms such as 'extend' and 'extendible' refer to a piston moving (further) out of a respective cylinder.

According to the disclosure at least one of the piston-cylinder assemblies is provided with a biasing means for biasing, at least selectively biasing, at least part of that piston-cylinder assembly towards engagement with the drive ring, preferably in particular substantially independent of and/or complementary to and/or countering a biasing by a pressure of pumping fluid at that piston-cylinder assembly.

According to an aspect the biasing means is a hydraulic and/or pneumatic biasing means. It has been found that such hydraulic and/or pneumatic biasing means can provide many advantages, in particular compared to known pumps and turbines in which for example a mechanical spring is provided as a biasing means. The hydraulic and/or pneumatic biasing means can be more compact, less heavy, and/or less prone to fretting. Further advantages will be evident to the skilled person, for example from the description and the drawings.

In embodiments the biasing means is at least partly integrated in the at least one of the piston-cylinder assemblies, or vice versa. In embodiments the biasing means at least partly extends inside the at least one of the piston-cylinder assemblies.

According to aspects and/or in embodiments the biasing means of a piston-cylinder assembly is at least selectively connected to at least another one of the piston-cylinder assemblies for receiving a variable actuation signal therefrom, wherein the at least selective biasing is preferably at least partly dependent on the received actuation signal.

It has been found that such a connection can enable a compact and reliable biasing means, in particular when such a connection is between piston-cylinder assemblies and/or groups thereof which are operated in a substantially opposite phase relative to each other. Such a connection is preferably a hydraulic and/or pneumatic connection, but can alternatively be a mechanical connection or electrical connection, for example.

In embodiments the variable actuation signal corresponds at least partly to a variable relative position of a respective piston with respect to a respective cylinder of the at least one other one of the piston-cylinder assemblies.

In embodiments the biasing means is configured such that the at least one of the piston-cylinder assemblies is extended, at least selectively extended, when another one of the piston-cylinder assemblies is compressed.

In embodiments the biasing means is selectively operable in at least a first operating state or a second operating state, each being in particular selectable by a controller, wherein in the first operating state, the biasing means is configured for biasing the at least one piston-cylinder assembly towards engagement with the drive ring, wherein in the second operating state, compared to the first operating state, the biasing means is configured for less or not biasing said assembly towards engagement with the drive ring and/or away from said drive ring.

In embodiments the hydraulic and/or pneumatic biasing means is provided with a respective spring element, in particular an accumulator, wherein the biasing means is preferably further provided with a pump for pressurizing an operating fluid in the hydraulic and/or pneumatic biasing means.

In embodiments the multi piston pump is configured for pumping the pumping fluid through a respective first fluid circuit, wherein the hydraulic and/or pneumatic biasing means forms or is part of a second fluid circuit, which is preferably separate from the first fluid circuit.

In embodiments the biasing means is provided with a valve for selectively depressurizing the biasing means, at least a part thereof, at the at least one of the piston-cylinder assemblies.

In embodiments the at least one of the piston-cylinder assemblies comprises a first pressure chamber and a second pressure chamber, each having a respective variable volume which is dependent on a variable relative position of a respective piston with respect to a respective cylinder, wherein the first pressure chamber is configured for receiving and pressurizing pumping fluid, wherein the second pressure chamber forms part of the biasing means.

In embodiments the second pressure chamber is configured such that a positive pressure in the second pressure chamber promotes that the piston is moved out of the cylinder.

In embodiments the first pressure chamber forms part of the first fluid circuit, wherein the second pressure chamber forms part of the second fluid circuit.

In embodiments the biasing means further comprises an inversion means for selectively biasing the at least part of the at least one of the piston-cylinder assemblies away from engagement with the drive ring, wherein preferably said biasing away from engagement is selectable by a deselection of the biasing towards engagement by the biasing means.

In embodiments the inversion means comprises a valve for selectively pressurizing a third pressure chamber which is connected to the respective piston and to the respective cylinder such that a positive pressure in the third pressure chamber promotes that the piston is moved into the cylinder.

In embodiments the biasing means comprises a hydraulic and/or pneumatic connection between the at least one and another one of the piston-cylinder assemblies, wherein preferably a valve is provided in the hydraulic and/or pneumatic connection.

In embodiments each of the piston-cylinder assemblies is provided with a biasing means for biasing, at least selectively biasing, that piston-cylinder assembly towards engagement with the drive ring.

In embodiments a plurality of biasing means are provided, preferably associated with a respective plurality of piston-cylinder assemblies, wherein said biasing means are connected or connectable to each other, in particular connected or connectable by a common hydraulic and/or pneumatic circuit.

In embodiments the multi-piston pump is configured such that during operation each piston-cylinder assembly is repeatedly subsequently compressed by the drive ring and extended by at least the biasing means.

An aspect of the present disclosure provides a multi piston pump for a turbine, the multi piston pump comprising a central part and a drive ring, wherein the central part comprises a series of piston-cylinder assemblies which are each compressible and extendible in a respective radial direction with respect to a common central axis, wherein each of the piston-cylinder assemblies is directly or indirectly engageable by the drive ring for radial compression thereof, in particular for pressurizing a pumping fluid. At least one of the piston-cylinder assemblies is provided with a hydraulic and/or pneumatic biasing means for biasing, at least selectively biasing, that piston-cylinder assembly towards engagement with the drive ring, in particular substantially independent of and/or complementary to a biasing by a pressure of pumping fluid at that piston-cylinder assembly.

In embodiments the drive ring can extend around the central part. In embodiments the drive ring can be provided around the central axis, engaging the inward facing ends of the piston-cylinder assemblies in stead of the outward facing ends thereof.

A further aspect provides a method of operating a multi-piston pump which comprises a series of piston-cylinder assemblies and a drive ring extending around said series, wherein the method comprises hydraulically and/or pneumatically biasing, at least selectively biasing, at least one of the piston-cylinder assemblies towards engagement with the drive ring.

A further aspect provides a method of operating a turbine and/or a multi piston pump, the method comprising: providing an operating fluid, in particular water or a water-glycol based hydraulic fluid, in hydraulic and/or pneumatic biasing means, and preferably pressurizing said operating fluid.

In order to further elucidate the present invention, embodiments thereof shall be disclosed and discussed hereafter, with reference to the drawings. The drawings are schematic. In the drawings.

In this description, embodiments are shown and disclosed of the invention, by way of example only. These should by no means be interpreted or understood as limiting the scope of the present invention in any way. In this description the same or similar elements are indicated by the same or similar reference signs.

Figure 1:
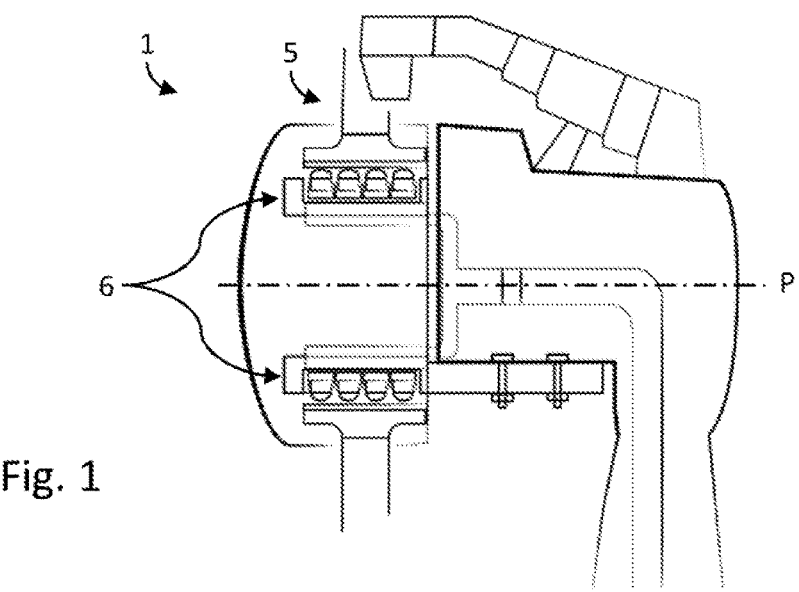
FIG. 1 shows in cross section part of a turbine, showing a multi piston pump.

FIG. 1 shows a turbine 1, wherein a propeller 5 is mounted to said turbine 1, rotatable around a propeller axis P, wherein a multi piston pump 6 is provided, said multi piston pump 6 being drivable by said propeller 5 for pressurizing a pumping fluid. The turbine 1 can be a wind turbine 1.

Figure 2:
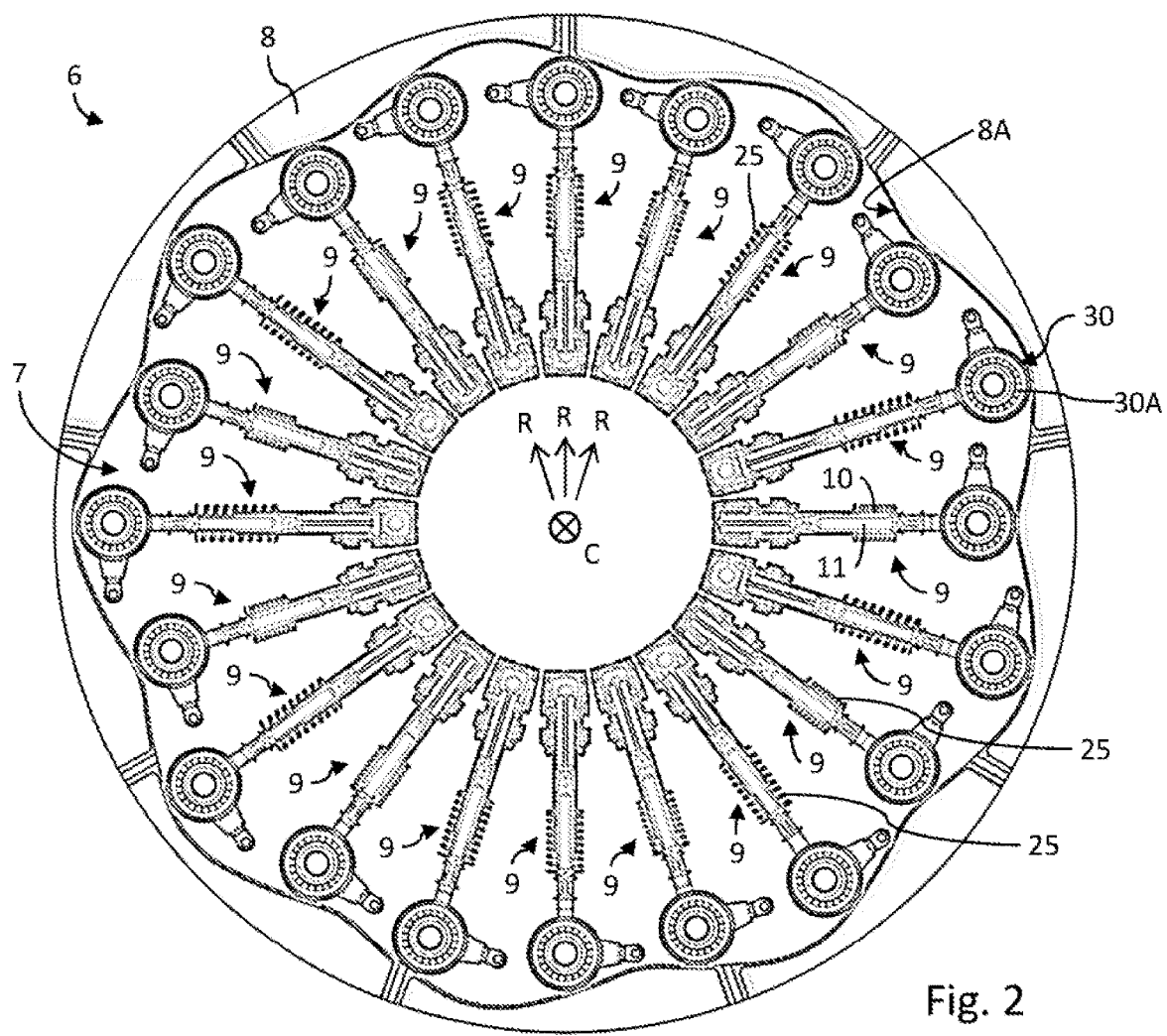
FIG. 2 shows in cross section part of a multi piston pump.

As shown in FIG. 2, the multi piston pump 6 comprises a central part 7 and a drive ring 8, which is in FIG. 2 shown as extending around the central part 7. The central part 7 comprises a series of piston-cylinder assemblies 9 which are each compressible and extendible in a respective radial direction R with respect to a common central axis C, wherein each of the piston-cylinder assemblies 9 is directly or indirectly engageable by the drive ring 8 for radial compression thereof, in particular for pressurizing said pumping fluid. Each piston-cylinder assembly comprises at least a piston 11 and a cylinder 10, the piston 11 being movable inside the cylinder 10 in the relevant radial direction R. Such movement of the relevant piston 11 relative to the cylinder 10 will lead to extension or compression of the assembly 9. Extension and compression can be obtainable by movement of the piston inside the cylinder of such assembly.

It will be appreciated that in FIG. 2, while only three radial directions R have been indicated by respective arrows, each piston-cylinder assembly is associated with a respective radial direction. The central axis C may substantially coincide with the propeller axis P, but that is not strictly necessary.

It will be appreciated while FIG. 2 shows a particular number of piston-cylinder assemblies, a multi piston pump may comprise a different number of piston-cylinder assemblies. It will also be appreciated that piston-cylinder assemblies and/or groups thereof may be arranged parallel to each other, for example parallel when viewed perpendicular to the central axis C.

As is for example shown in FIG. 2 the drive ring 8 can have an undulating surface 8A facing the central axis C, against which surface 8A an end 30, preferably an engagement element 30A such as a wheel or bearing of each piston-cylinder assembly 9 runs. The undulating surface 8A, having tops and valleys, when rotating the central part 7 relative to the ring 8 the ends 30 will periodically be forced inward, towards the central axis, compressing the relevant assembly 9. After such compression the relevant assembly has to expand again, for which preferably the end 30 is, when so desired, maintaining contact with the surface 8A. In the present disclosure biasing means 12 are provided in order to aid in maintaining, when desired, said contact. By using hydraulic and/or pneumatic biasing means 12 a biasing force can easily and effectively be controlled, as will be explained hereafter.

With reference to FIGS. 3a-b and 4a-b, at least one 9a of the piston-cylinder assemblies 9 is provided with a hydraulic and/or pneumatic biasing means 12 for biasing, at least selectively biasing, at least part of that piston-cylinder assembly 9a towards engagement with the drive ring 8. The hydraulic and/or pneumatic biasing means 12 is preferably a substantially hydraulic biasing means 12. Biasing has to be understood as at least meaning providing a positive force towards or away from the drive ring 8, in order to maintain engagement of for example the end 30 of the relevant assembly 9, such as for example a wheel, and the drive ring 8, or to positively force the said end 30 away from said drive ring 8. An hydraulic and/or pneumatic biasing means 12 has to be understood as including any at least partly hydraulic and/or pneumatic based system allowing to provide for a force on and/or in a piston-cylinder assembly or part thereof, for forcing an end 30, preferably an engagement element 30A towards the surface 8A of the drive ring 8 and/or away from said surface. Such hydraulic and/or pneumatic biasing means 12 can for example be or comprise a linear system, such as a piston-cylinder assembly, or a rotating system, such as a hydraulic of pneumatic motor or pump, and can be provided directly engaging the piston 11 and/or cylinder 10 of a relevant piston-cylinder assembly 9 or can for example be provided with linkage between the biasing means 12 and the piston-cylinder assembly 9, such as for example mechanical or fluidal based linkage.

Said at least selective biasing is in particular substantially independent of and/or complementary to a biasing by a pressure of pumping fluid at that piston-cylinder assembly 9a. Thus, it will be appreciated that, during operation, at least part of a piston-cylinder assembly 9a may in fact be additionally, e.g. independently, biased by a pressure of pumping fluid at that piston-cylinder assembly 9a, which additional biasing as such may however be insufficient, at least in some cases and/or at least part of the time, to engage the piston-cylinder assembly 9a with the drive ring 8.

The at least selective biasing is preferably such that it ensures a substantially continuous engagement of the relevant end 30 of the assembly 9 with the drive ring 8. However, this is not essential. In embodiments, the at least selective biasing by the biasing means 12 may be stronger when engagement with the drive ring 8 is not yet achieved and/or weaker or substantially absent when the piston-cylinder assembly 9a is engaged with the drive ring. In other words, in some embodiments, the biasing means 12 can promote engagement with the drive ring 8 without necessarily fully enforcing such engagement.

The biasing means 12 may comprise a hydraulic and/or pneumatic spring 18 and/or a hydraulic and/or pneumatic pump 17, as will be elucidated further.

FIG. 2 shows that piston-cylinder assemblies 9 may be provided, e.g. each, with a respective mechanical spring 25, however this is not essential. If provided, such a mechanical spring 25 can for example complement the biasing means 12, wherein some additional biasing can be performed by the mechanical spring 25. The presence of such a mechanical spring 25 shall not by itself be understood as to render any biasing means different from hydraulic and/or pneumatic.

By using hydraulic and/or pneumatic biasing means 12 in addition to or in stead of such mechanical spring 25 can provided the advantage that for example the biasing pressure can be reduced or removed or even reversed when compressing the relevant piston-cylinder assembly, requiring less force for such compression, whereas the biasing pressure can be provided for at a desired level when the piston-cylinder assembly 9 has to expand again. Thus the effectivity of the pump cq turbine can be improved, and wear can be reduced.

In embodiments, as shown in FIGS. 3a-b and 4a-b, the biasing means 12 is at least partly integrated in the at least one 9a of the piston-cylinder assemblies 9, wherein preferably the biasing means 12 at least partly extends inside the at least one 9a of the piston-cylinder assemblies 9.

Figure 5:
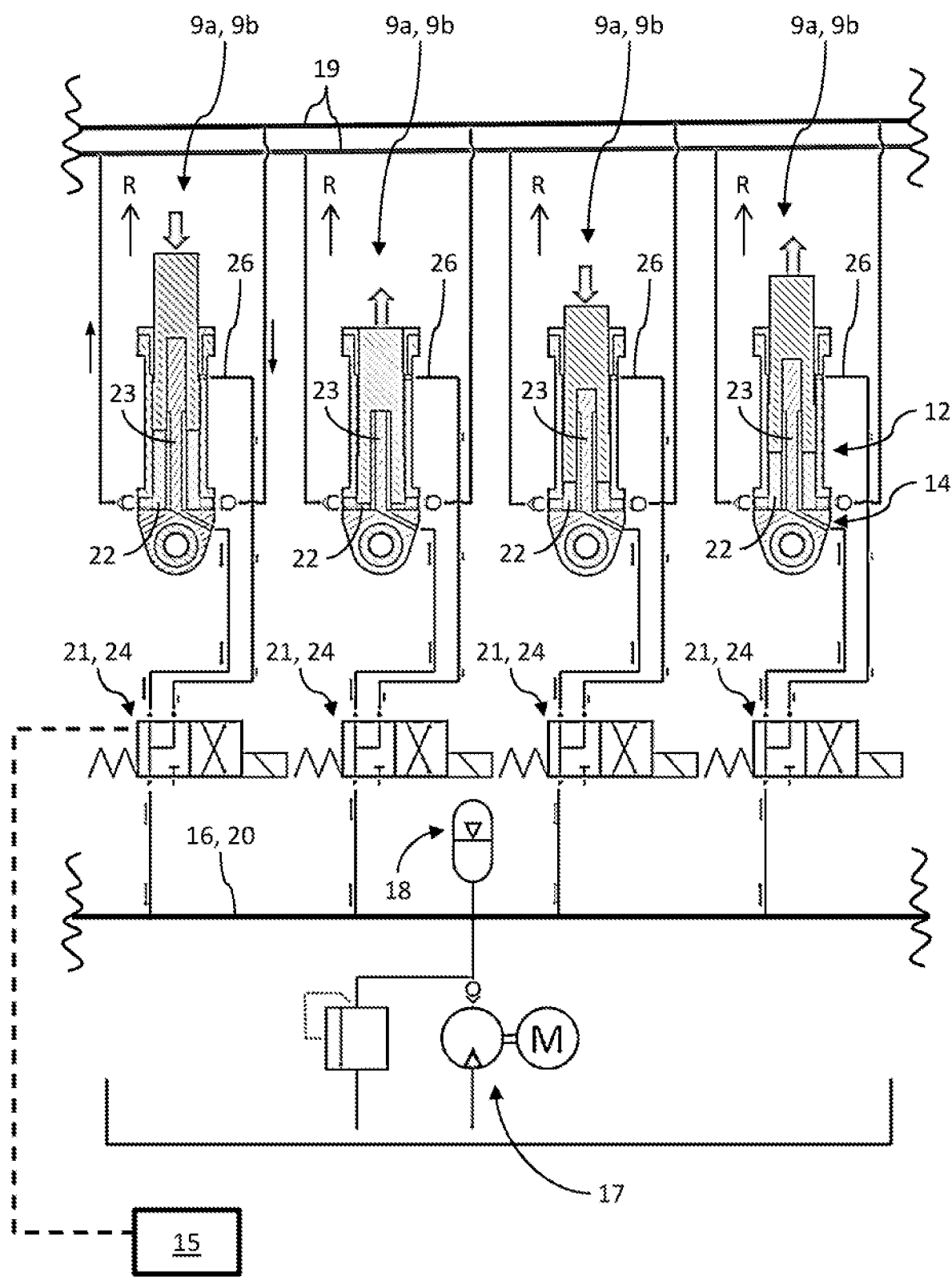
FIG. 5 shows hydraulic and/or pneumatic circuits and an associated series of piston-cylinder assemblies of a multi piston pump.
Figure 6A:
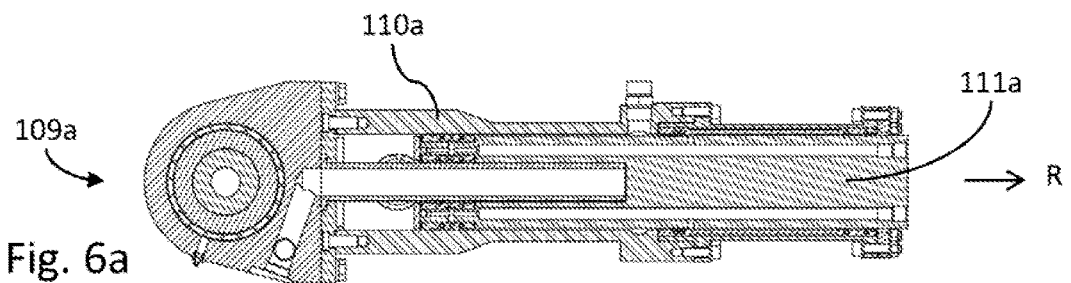
FIGS. 6a-d each show in cross section a piston-cylinder assembly, wherein in the different figures respective pistons are in different positions relative to their respective cylinders.
Figure 6B:
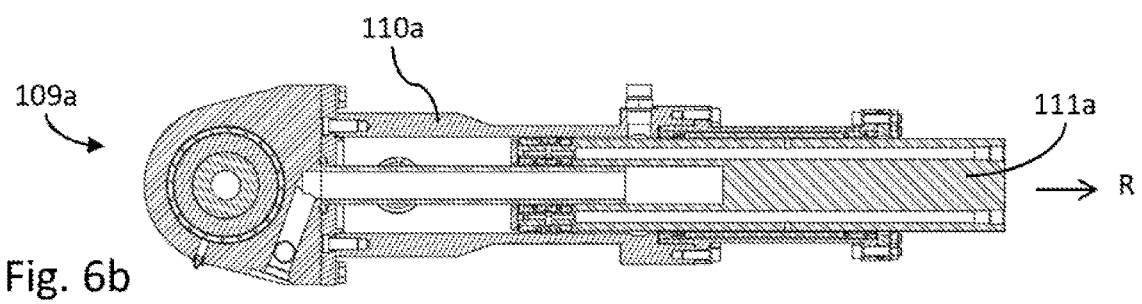
Figure 6C:
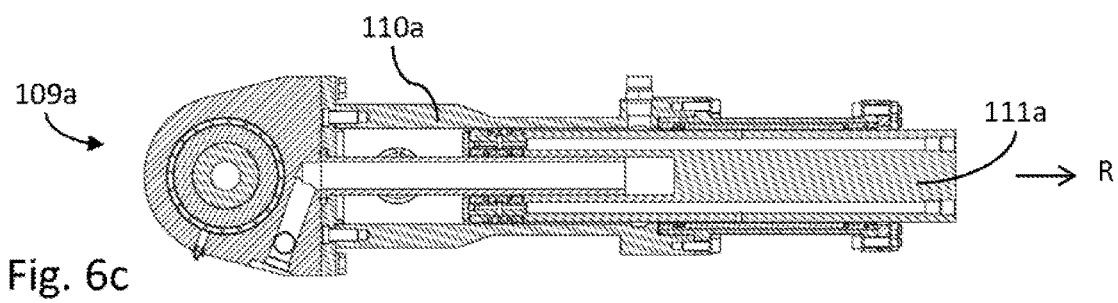
Figure 6D:
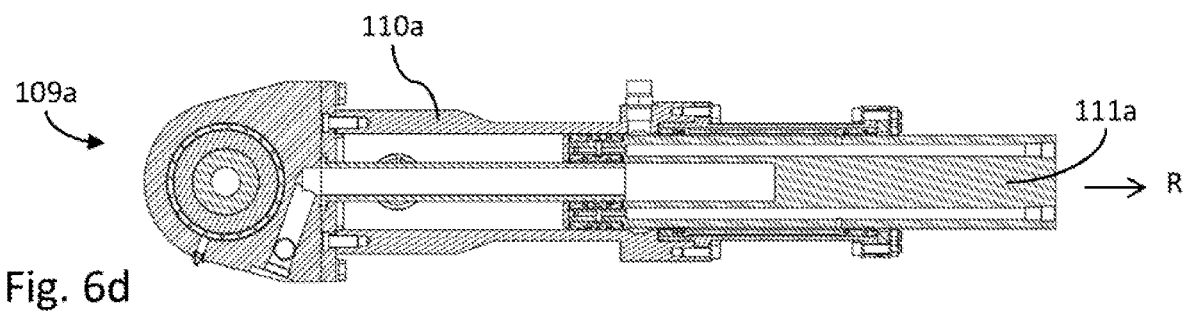

In embodiments, as shown in FIG. 5, the biasing means 12 is at least selectively connected to at least other one 9b of the piston-cylinder assemblies 9 for receiving a variable actuation signal therefrom, wherein the at least selective biasing is at least partly dependent on the received actuation signal. To that end, the biasing means 12 may be provided with a respective input 14, for example a hydraulic and/or pneumatic input 14 (see FIGS. 3a-b and 4a-b), and may comprise a sensor, such as a position sensor and/or a pressure sensor system including valves 21, 24, as will be described.

The variable actuation signal may correspond at least partly to a variable relative position of a respective piston 11b with respect to a respective cylinder 10b of the at least other one 9b of the piston-cylinder assemblies 9.

As an example, FIG. 5 shows how such an actuation signal can be relayed through a hydraulic and/or pneumatic connection 16.

It will be appreciated that while in FIG. 5, the piston-cylinder assemblies 9a are shown substantially parallel to each other, said assemblies 9a can be arranged differently with respect to each other.

In embodiments the biasing means 12 is configured such that the at least one 9a of the piston-cylinder assemblies 9 is extended, at least selectively extended, when another one 9b of the piston-cylinder assemblies 9 is compressed.

In FIG. 3-6 piston-cylinder assembly are shown having their radial direction R parallel. This is obviously only done for explanatory purposes and does not represent their actual position in a pump or turbine. Piston-cylinder assemblies 9 shown in these figures next to each other may not be next to each other in an actual pump or turbine, but for example radially opposite each other.

In FIG. 5, block arrows at ends 30 of the pistons indicate possible piston movement directions at some exemplary moment in time. It will be appreciated that such piston movements can thus be substantially reciprocal, i.e. the sum of the piston movements can be substantially zero so that a combined volume of hydraulic and/or pneumatic operating fluid can be substantially constant, at least at a substantially stable fluid pressure. In this way, a particularly compact and efficient biasing means 12 or series of connected biasing means 12 can be provided.

In embodiments, the biasing means 12 is selectively operable in at least a first operating state or a second operating state, each being in particular selectable by a controller 15, wherein in the first operating state, the biasing means 12 is configured for biasing the at least one piston-cylinder assembly 9a towards engagement with the drive ring 8, wherein in the second operating state, compared to the first operating state, the biasing means 12 is configured for less or not biasing said assembly 9a towards engagement with the drive ring 8 or even away from said drive ring 8.

An exemplary controller 15 is shown in FIG. 5, wherein it will be appreciated that the controller 15 is preferably connected to or at least can communicate with one or more hydraulic and/or pneumatic elements such as those shown in FIG. 5, in particular valves 21. Thus, in an embodiment, the controller 15 may select an operating state by controlling, e.g. actuating, one or more of the valves 21.

In embodiments, the hydraulic and/or pneumatic biasing means 12 is provided with a respective spring element 18, in particular an accumulator 18, wherein the biasing means is preferably further provided with a pump 17 for pressurizing an operating fluid in the hydraulic and/or pneumatic biasing means 12. The spring element 18 may be a hydropneumatic spring element, for example a gas-charged accumulator 18. The operating fluid itself may or may not be compressible. In case of a substantially compressible operating fluid, e.g. a gas, such a spring element may alternatively or additionally be provided by the (preferably pressurized) operating fluid itself, in particular by a volume thereof.

In embodiments, as shown in FIG. 5, the multi piston pump 6 is configured for pumping the pumping fluid, such as for example water, especially sea water, through a respective first fluid circuit 19, wherein the hydraulic and/or pneumatic biasing means 12 forms or is part of a second fluid circuit 20 which is separate from the first fluid circuit 19.

In embodiments, the biasing means 12 is provided with a valve 21 for selectively depressurizing the biasing means 12, at least a part thereof, at the at least one 9a of the piston-cylinder assemblies 9.

It will be appreciated that thus a part of the biasing means 12 may be depressurized while another part of the biasing means 12 may remain or become pressurized, wherein said part and other part may or may not be at the same piston-cylinder assembly 9a. For example, as will be elucidated further, an input 14 of a piston-cylinder assembly 9a may thus be depressurized while an inversion channel 26 associated with the same piston-cylinder assembly may remain or become pressurized.

In embodiments, as shown in FIGS. 3a-b and 4a-b, the at least one 9a of the piston-cylinder assemblies 9 comprises a first pressure chamber 22 and a second pressure chamber 23, each having a respective variable volume which is dependent on a variable relative position of a respective piston 11a with respect to a respective cylinder 10a, wherein the first pressure chamber 22 is configured for receiving and pressurizing pumping fluid, wherein the second pressure chamber 23 forms part of the biasing means 12. The second pressure chamber 23 is preferably configured such that a positive pressure in the second pressure chamber 23 promotes that the piston 11a is moved out of the cylinder 10a. Movement of a piston 11 into a cylinder 10 should be understood as meaning relative movement of the piston 11 and the cylinder 10, such that a volume of a piston chamber of the assembly for holding pumping fluid is reduced, compressing pumping fluid therein.

Figure 3A:
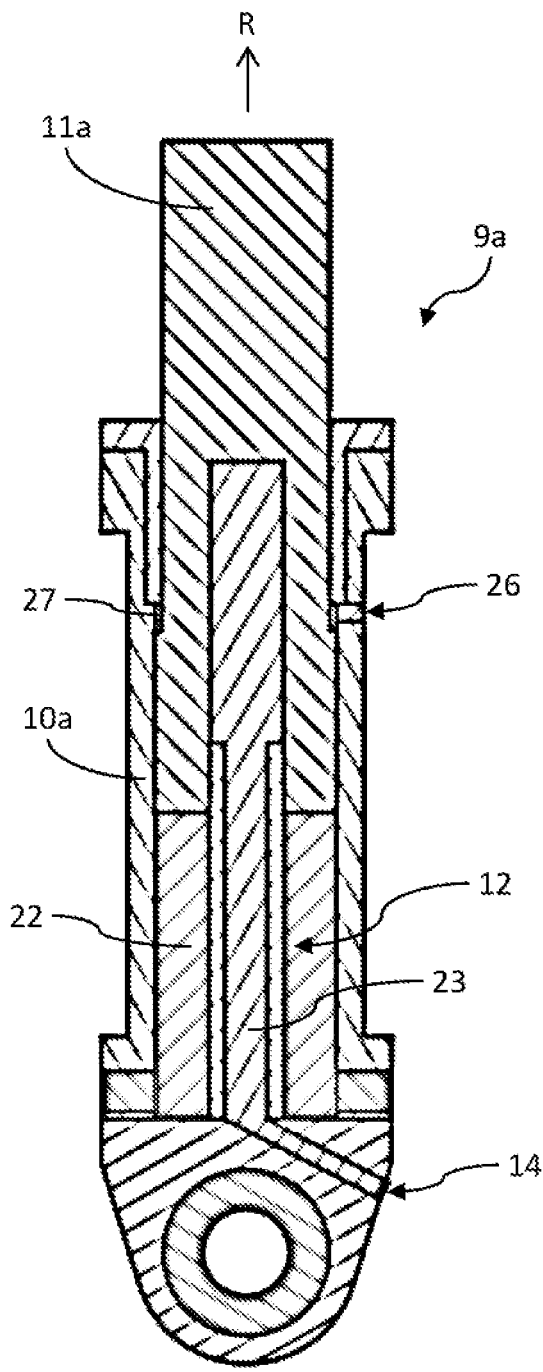
FIG. 3a shows in cross section a piston-cylinder assembly, wherein a piston is in a first position relative to a cylinder.
Figure 3B:
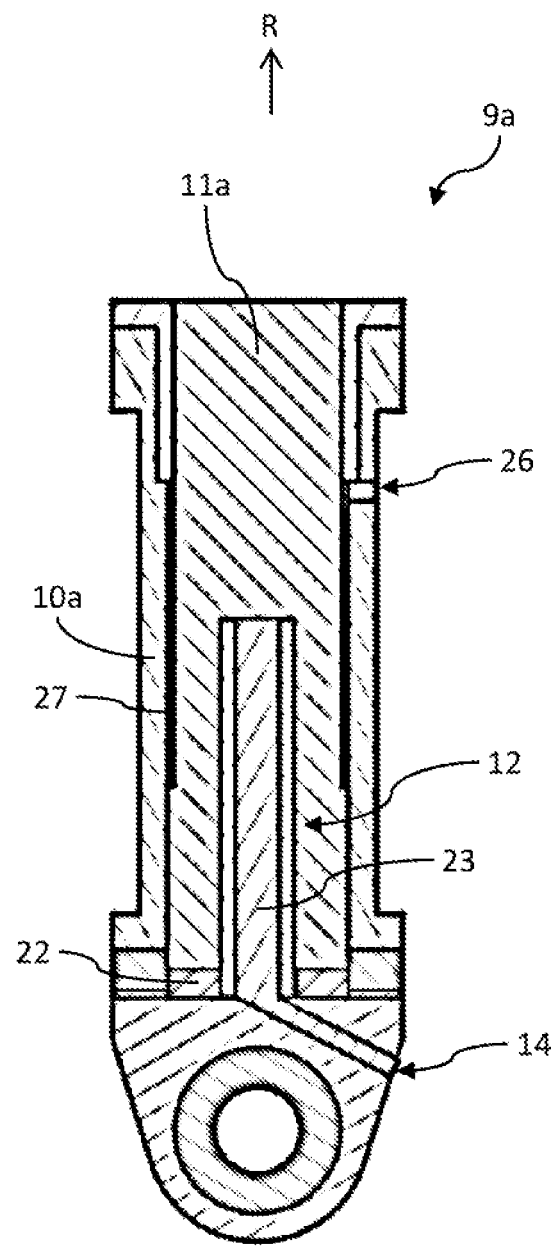
FIG. 3b shows in cross section a piston-cylinder assembly, wherein a piston is in a second position relative to a cylinder.
Figure 4A:
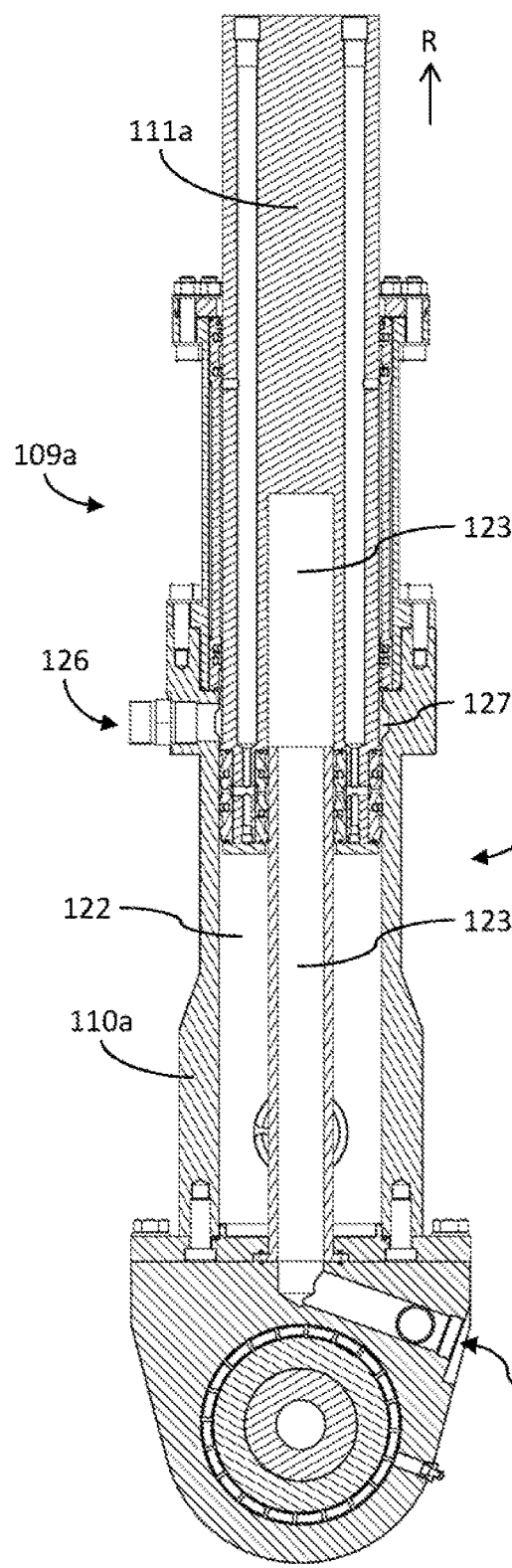
FIG. 4a shows in cross section a piston-cylinder assembly, wherein a piston is in a first position relative to a cylinder.
Figure 4B:
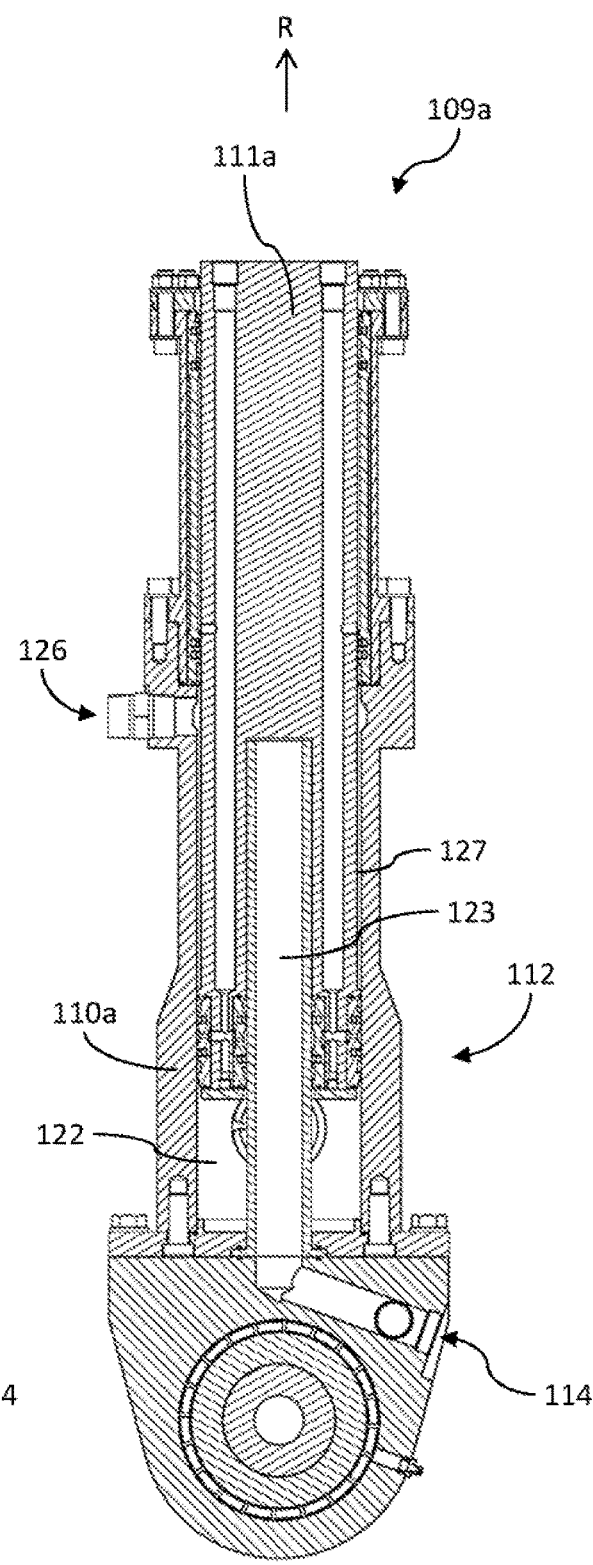
FIG. 4b shows in cross section a piston-cylinder assembly, wherein a piston is in a second position relative to a cylinder.

While in FIGS. 3a-b the first and second pressure chambers 22 and 23 have each been indicated as a dashed area, it will be appreciated that such pressure chambers are preferably substantially hollow. During operation, such pressure chambers 22, 23 may be filled with a fluid.

As shown, either or both of the first and second pressure chamber 22 and 23 may extend between and/or be bound by the respective piston 11a and the respective cylinder 10a. Alternatively, for example, the second pressure chamber 23 may be arranged outside the piston 11a and/or outside the cylinder 10a.

FIGS. 3a-b and 4a-b show that the first pressure chamber 22 and second pressure chamber 23 are preferably arranged concentric with respect to each other and/or with respect to the piston-cylinder assembly 9a, in particular viewed in the radial direction R. In this way, pressurization forces associated with the piston-cylinder assembly 9a can be well balanced with respect to the said assembly 9a and/or with respect to each other.

The first and second pressure chambers 22 and 23 are preferably separate from each other, in particular substantially fluidly isolated from each other. Alternatively, in some embodiments, said pressure chambers 22 and 23 may be at least partly fluidly connected to each other, for example by a constricted fluid connection, such that a fluid pressure in the first pressure chamber 22 may still differ from a respective fluid pressure in the second pressure chamber 23. In such latter embodiment the constriction may be controllable in order to control the pressure difference.

In embodiments, with reference to FIG. 5, the first pressure chamber 22 forms part of the first fluid circuit 19, wherein the second pressure chamber 23 forms part of the second fluid circuit 20.

In embodiments, the biasing means 12 further may comprise an inversion means 24 for selectively biasing the at least part of the at least one 9a of the piston-cylinder assemblies 9 away from engagement with the drive ring 8, wherein preferably said biasing away from engagement is selectable by a deselection of the biasing towards engagement by the biasing means 12.

In an embodiment as shown in FIG. 5, the inversion means 24 comprises a valve 21 (and preferably an associated controller 15) for selectively pressurizing a third pressure chamber 27 (see FIGS. 3a-b and 4a-b) which is connected to the respective piston 11a and the respective cylinder 10a such that a positive pressure in the third pressure chamber 27 promotes that the piston 11a is moved into the cylinder 10a.

An inversion channel 26 may operatively connect the valve 21 to the third pressure chamber 27.

The third pressure chamber 27 is thus configured such that when it is pressurized, in particular while the second pressure chamber 23 is not or less pressurized, the piston 11a is urged to move (further) into the cylinder 10a by the pressure in the third pressure chamber 27. Thus, in this way, a piston-cylinder assembly 9a can be selectively disengaged from the drive ring 8, while the multi piston pump 6 can otherwise remain operational. Such disengagement can be desirable for example when the piston-cylinder assembly is malfunctioning or when the multi piston pump 6 is required to run at a lower than full capacity.

In embodiments, the biasing means 12 comprises a hydraulic and/or pneumatic connection 16 between the at least one 9a and at least one other one 9b of the piston-cylinder assemblies 9, wherein preferably a valve 21 is provided in the hydraulic and/or pneumatic connection 16.

In this way, a substantially constant volume of operating fluid can be shared by the at least one 9a and the other one 9b of the piston-cylinder assemblies 9, so that for example a compression of the other one 9b can cause or promote an extension of the at least one 9a (and/or vice versa). Thus, as an additional advantage, a single accumulator 18 and a single pump 17 can be provided, associated with multiple, preferably all, of the piston-cylinder assemblies 9.

In preferred embodiments, each of the piston-cylinder assemblies 9 is provided with a biasing means 12 for biasing, at least selectively biasing, that piston-cylinder assembly 9 towards engagement with the drive ring 8.

In preferred embodiments, a plurality of biasing means 12 are provided, preferably associated with a respective plurality of piston-cylinder assemblies 9, wherein said biasing means 12 are connected or connectable to each other, in particular connected or connectable by a common hydraulic and/or pneumatic circuit 20.

In embodiments, the multi-piston pump 6 is configured such that during operation each piston-cylinder assembly 9 is repeatedly subsequently compressed by the drive ring 8 and extended by at least the biasing means 12.

In an exemplary method of operating a turbine 1 and/or a multi piston pump 6, an operating fluid, in particular water or a water-glycol hydraulic fluid, is provided in the hydraulic and/or pneumatic biasing means 12, wherein preferably said operating fluid is pressurized. Such use of water or water-glycol can provide the advantage that any spillage of operating fluid is substantially harmless to the environment, e.g. an aquatic environment.

The disclosure is by no means limited to the embodiments disclosed in the drawings. Many amendments, variations and alternatives are possible within the disclosure. For example in a pump or turbine of the disclosure the central part can be rotated, and the drive ring can be stationary, or both the central part and the ring can be rotated. The drive ring can be provided around the central axis, engaging the inward facing ends of the piston-cylinder assemblies 9 in stead of the outward facing ends 30. The control 15 can be an electronically operated control. The turbine can be a hydraulic turbine in stead of a gas operated turbine, such as a wind turbine. These and many other amendments are considered to have been disclosed herein also, including but not limited to all combinations of elements of the invention as disclosed, within the scope of the invention as presented.

LIST OF REFERENCE SIGNS

1. Turbine
5. Propeller
6. Multi piston pump
7. Central part
8. Drive ring
8. Surface
9. Piston-cylinder assembly
10. Cylinder
11. Piston
12. Biasing means
14. Input
15. Controller
16. Hydraulic and/or pneumatic connection between the at least one and the other one of the piston-cylinder assemblies
17. Hydraulic and/or pneumatic pump
18. Spring element
19. First fluid circuit
20. Second fluid circuit
21. Valve
22. First pressure chamber
23. Second pressure chamber
24. Inversion means
25. Mechanical spring
26. Inversion channel
27. Third pressure chamber
30. End
30A. Engagement element
C. Central axis
P. Propeller axis
R. Radial direction

The invention claimed is:

1. A turbine, wherein a propeller is mounted to said turbine, rotatable around a propeller axis, wherein a multi piston pump is provided, said multi piston pump being drivable by said propeller for pressurizing a pumping fluid,
wherein the multi piston pump comprises a central part and a drive ring, wherein the central part comprises a series of piston-cylinder assemblies, wherein each piston-cylinder assembly is compressible and extendible in a respective radial direction with respect to a common central axis, wherein each of the piston-cylinder assemblies is directly or indirectly engageable by the drive ring for radial compression thereof for pressurizing said pumping fluid,
wherein at least one of the piston-cylinder assemblies is provided with a hydraulic and/or pneumatic biasing means for at least selectively biasing at least part of said at least one piston-cylinder assembly towards engagement with the drive ring substantially independent of a pressure of said pumping fluid at said at least one piston-cylinder assembly.

2. The turbine according to claim 1, wherein the hydraulic and/or pneumatic biasing means is at least partly integrated in the at least one of the piston-cylinder assemblies.

3. The turbine according to claim 2, wherein the hydraulic and/or pneumatic biasing means at least partly extends inside the at least one of the piston-cylinder assemblies.

4. The turbine according to claim 1, wherein the hydraulic and/or pneumatic biasing means is at least selectively connected to at least another one of the piston-cylinder assemblies for receiving a variable actuation signal therefrom, wherein the at least selectively connecting is at least partly dependent on the received actuation signal.

5. The turbine according to claim 4, wherein the variable actuation signal corresponds at least partly to a variable relative position of a respective piston with respect to a respective cylinder of the at least other one of the piston-cylinder assemblies.

6. The turbine according to claim 1, wherein the hydraulic and/or pneumatic biasing means is configured such that the at least one of the piston-cylinder assemblies is at least selectively extended when another one of the piston-cylinder assemblies is compressed.

7. The turbine according to claim 1, wherein the hydraulic and/or pneumatic biasing means is selectively operable in a first operating state or a second operating state, each operating state being selectable by a controller, wherein in the first operating state, the hydraulic and/or pneumatic biasing means is configured for biasing the at least one piston-cylinder assembly towards engagement with the drive ring, wherein in the second operating state, compared to the first operating state, the hydraulic and/or pneumatic biasing means is configured for less or not biasing said piston-cylinder assembly towards engagement with the drive ring.

8. The turbine according to claim 1, wherein the hydraulic and/or pneumatic biasing means is provided with a respective spring element, wherein the hydraulic and/or pneumatic biasing means is provided with a pump for pressurizing an operating fluid in the hydraulic and/or pneumatic biasing means.

9. The turbine according to claim 1, wherein the multi piston pump is configured for pumping the pumping fluid through a respective first fluid circuit, wherein the hydraulic and/or pneumatic biasing means forms or is part of a second fluid circuit which is separate from the first fluid circuit.

10. The turbine according to claim 9, wherein the at least one of the piston-cylinder assemblies comprises a first pressure chamber and a second pressure chamber, each having a respective variable volume which is dependent on a variable relative position of a respective piston with respect to a respective cylinder, wherein the first pressure chamber is configured for receiving and pressurizing pumping fluid, wherein the second pressure chamber forms part of the hydraulic and/or pneumatic biasing means.

11. The turbine according to claim 10, wherein the first pressure chamber forms part of the first fluid circuit, wherein the second pressure chamber forms part of the second fluid circuit.

12. The turbine according to claim 10, wherein the second pressure chamber is configured such that a positive pressure in the second pressure chamber promotes that the piston is moved out of the cylinder.

13. The turbine according to claim 1, wherein the hydraulic and/or pneumatic biasing means is provided with a valve for selectively depressurizing at least a part of the hydraulic and/or pneumatic biasing means at the at least one of the piston-cylinder assemblies.

14. The turbine according to claim 1, wherein the hydraulic and/or pneumatic biasing means further comprises an inversion means for selectively biasing the at least part of the at least one of the piston-cylinder assemblies away from engagement with the drive ring,
wherein said biasing away from engagement is selectable by a deselection of the biasing towards engagement by the hydraulic and/or pneumatic biasing means.

15. The turbine according to claim 14, wherein the inversion means comprises a valve for selectively pressurizing a third pressure chamber which is connected to the respective piston and to the respective cylinder such that a positive pressure in the third pressure chamber promotes that the piston is moved into the cylinder.

16. The turbine according to claim 1, wherein the hydraulic and/or pneumatic biasing means comprises a hydraulic and/or pneumatic connection between the at least one piston-cylinder assembly and another one of the piston-cylinder assemblies, wherein a valve is provided in the hydraulic and/or pneumatic connection.

17. The turbine according to claim 1, wherein each of the piston- cylinder assemblies is provided with the hydraulic and/or pneumatic biasing means for biasing each piston-cylinder assembly towards engagement with the drive ring.

18. The turbine according to claim 1, wherein a plurality of the hydraulic and/or pneumatic biasing means are provided and associated with a respective plurality of piston-cylinder assemblies, wherein said plurality of hydraulic and/or pneumatic biasing means are connected or connectable to each other by a common hydraulic and/or pneumatic circuit.

19. The turbine according to claim 1, wherein the multi-piston pump is configured such that during operation each piston-cylinder assembly is repeatedly subsequently compressed by the drive ring and extended by at least the hydraulic and/or pneumatic biasing means.

20. A method of operating the turbine or the multi piston pump according to claim 1, the method comprising: providing an operating fluid in the hydraulic and/or pneumatic biasing means, and pressurizing said operating fluid.

21. A turbine, wherein a propeller is mounted to said turbine, rotatable around a propeller axis, wherein a multi piston pump is provided, said multi piston pump being drivable by said propeller for pressurizing a pumping fluid,
wherein the multi piston pump comprises a central part and a drive ring, wherein the central part comprises a series of piston-cylinder assemblies which are each compressible and extendible in a respective radial direction with respect to a common central axis, wherein each of the piston-cylinder assemblies is directly or indirectly engageable by the drive ring for radial compression thereof for pressurizing said pumping fluid,
wherein at least one of the piston-cylinder assemblies is provided with a biasing means for at least selectively biasing at least part of said at least one piston-cylinder assembly towards engagement with the drive ring substantially independent of and/or complementary to a biasing by a pressure of pumping fluid at said at least one piston-cylinder assembly,
wherein the biasing means is at least selectively connected to at least another one of the piston-cylinder assemblies for receiving a variable actuation signal therefrom, wherein the at least selectively connecting is at least partly dependent on the received actuation signal.

22. The turbine according to claim 21, wherein the drive ring extends around the central part.

23. The turbine according to claim 21, wherein the variable actuation signal corresponds at least partly to a variable relative position of a respective piston with respect to a respective cylinder of the at least other one of the piston-cylinder assemblies.

24. The turbine according to claim 21, wherein the multi piston pump is configured for pumping the pumping fluid through a first fluid circuit, whereby the biasing means forms or is part of a second fluid circuit, wherein the first and second circuit are separate circuits.

25. A multi piston pump for a turbine, the multi piston pump comprising a central part and a drive ring, wherein the central part comprises a series of piston-cylinder assemblies which are each compressible and extendible in a respective radial direction with respect to a common central axis, wherein each of the piston-cylinder assemblies is directly or indirectly engageable by the drive ring for radial compression thereof for pressurizing a pumping fluid, wherein at least one of the piston-cylinder assemblies is provided with a hydraulic and/or pneumatic biasing means for at least selectively biasing said at least one piston-cylinder assembly towards engagement with the drive ring substantially independent of a pressure of pumping fluid at said at least one piston-cylinder assembly.

26. The multi-piston pump of claim 25, wherein the multi-piston pump is configured for pumping a pumping fluid through a first fluid circuit, whereby the hydraulic and/or pneumatic biasing means forms or is part of a second fluid circuit, wherein the first and second circuit are separate circuits.

27. A method of operating a multi-piston pump which comprises a series of piston-cylinder assemblies and a drive ring extending around said series of piston-cylinder assemblies, wherein the method comprises hydraulically and/or pneumatically biasing at least one of the piston-cylinder assemblies towards engagement with the drive ring during pumping of a pumping fluid, wherein said biasing is provided by a biasing force independent from a pressure of said pumping fluid.

* * * * *